Oct. 22, 1929.    R. W. PORTER ET AL    1,732,730
METHOD AND APPARATUS FOR MEASURING AND COMPARING GEARS AND THE LIKE
Filed May 3, 1923    6 Sheets-Sheet 1

Inventors:
Russell W. Porter,
Robert O. Beardsley,
by Wright Brown Quinby Day
Attys.

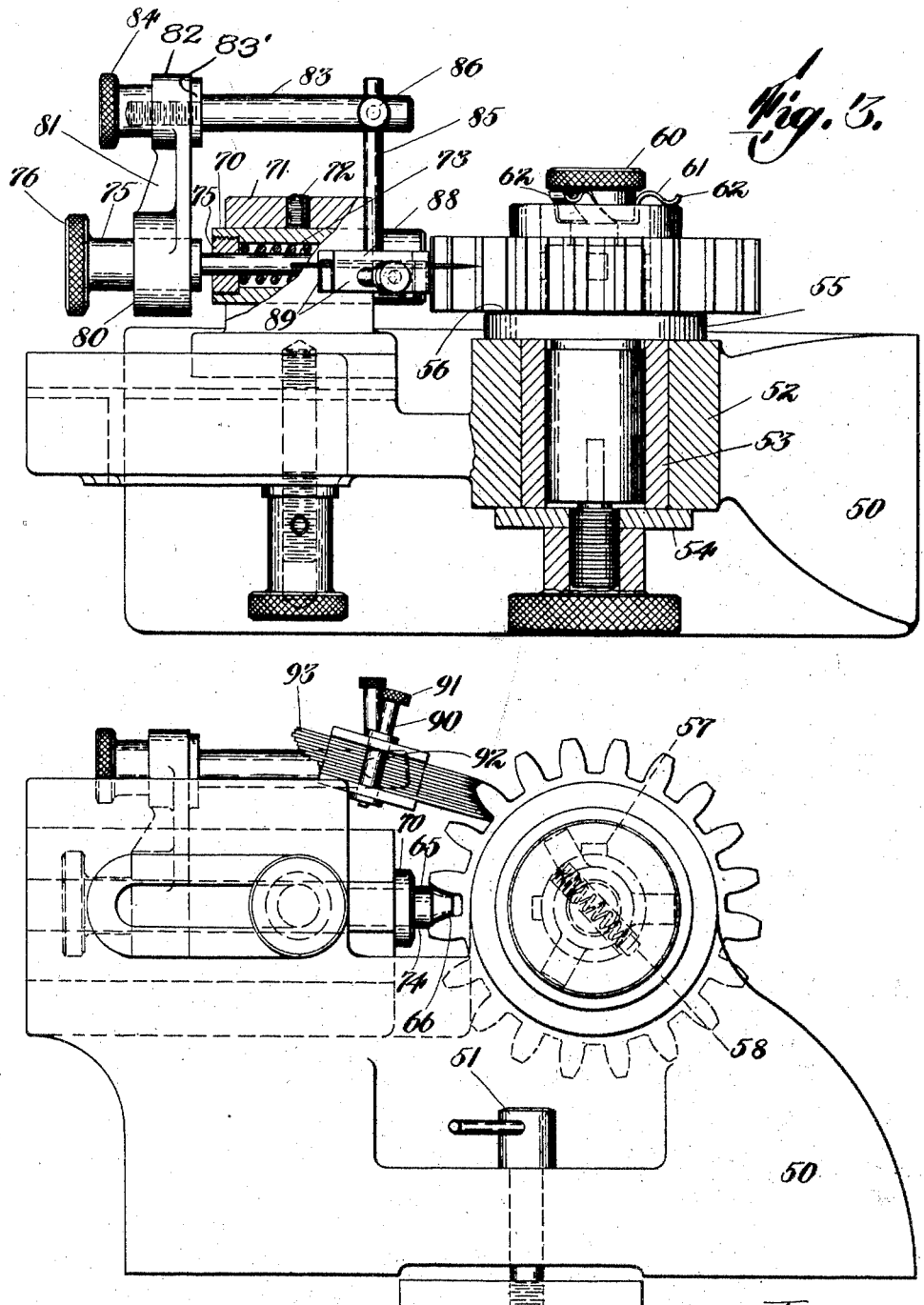

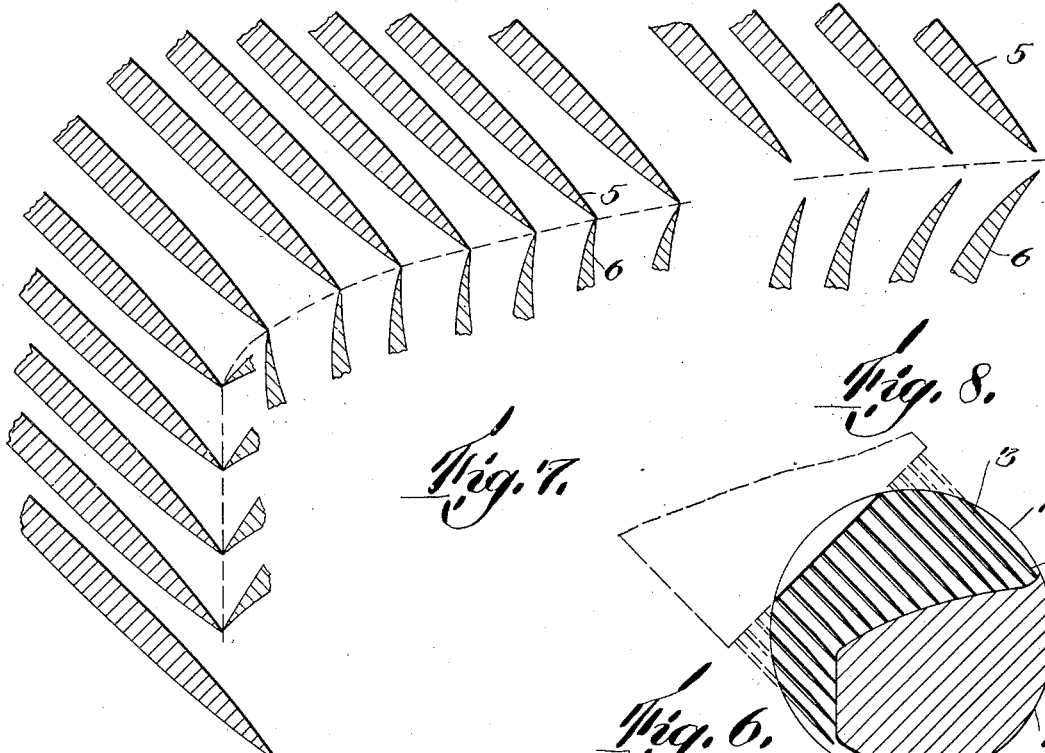
Fig. 7.
Fig. 8.
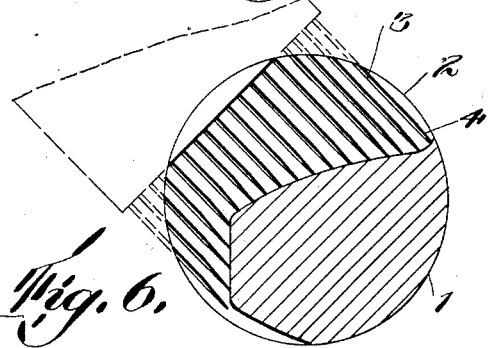
Fig. 6.
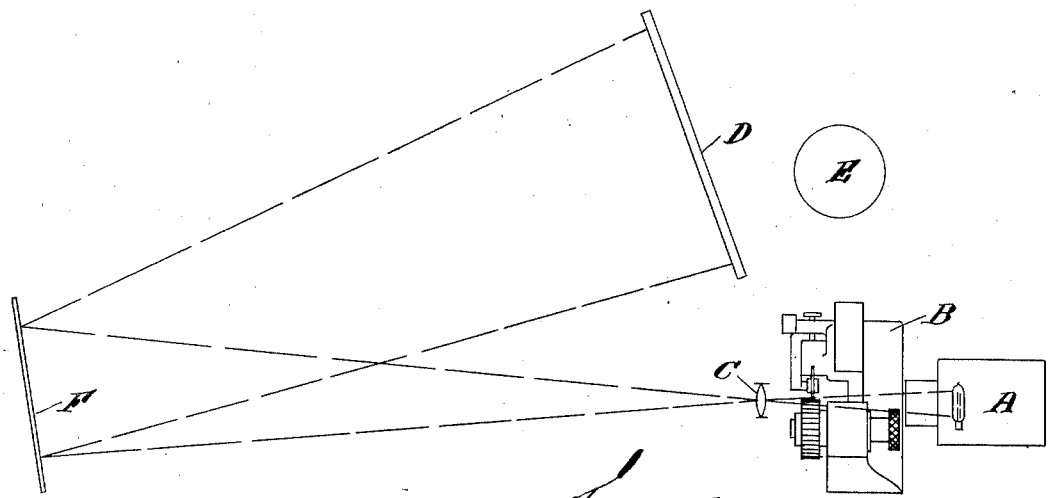
Fig. 5.
Inventors:
Russell W. Porter,
Robert O. Beardsley.

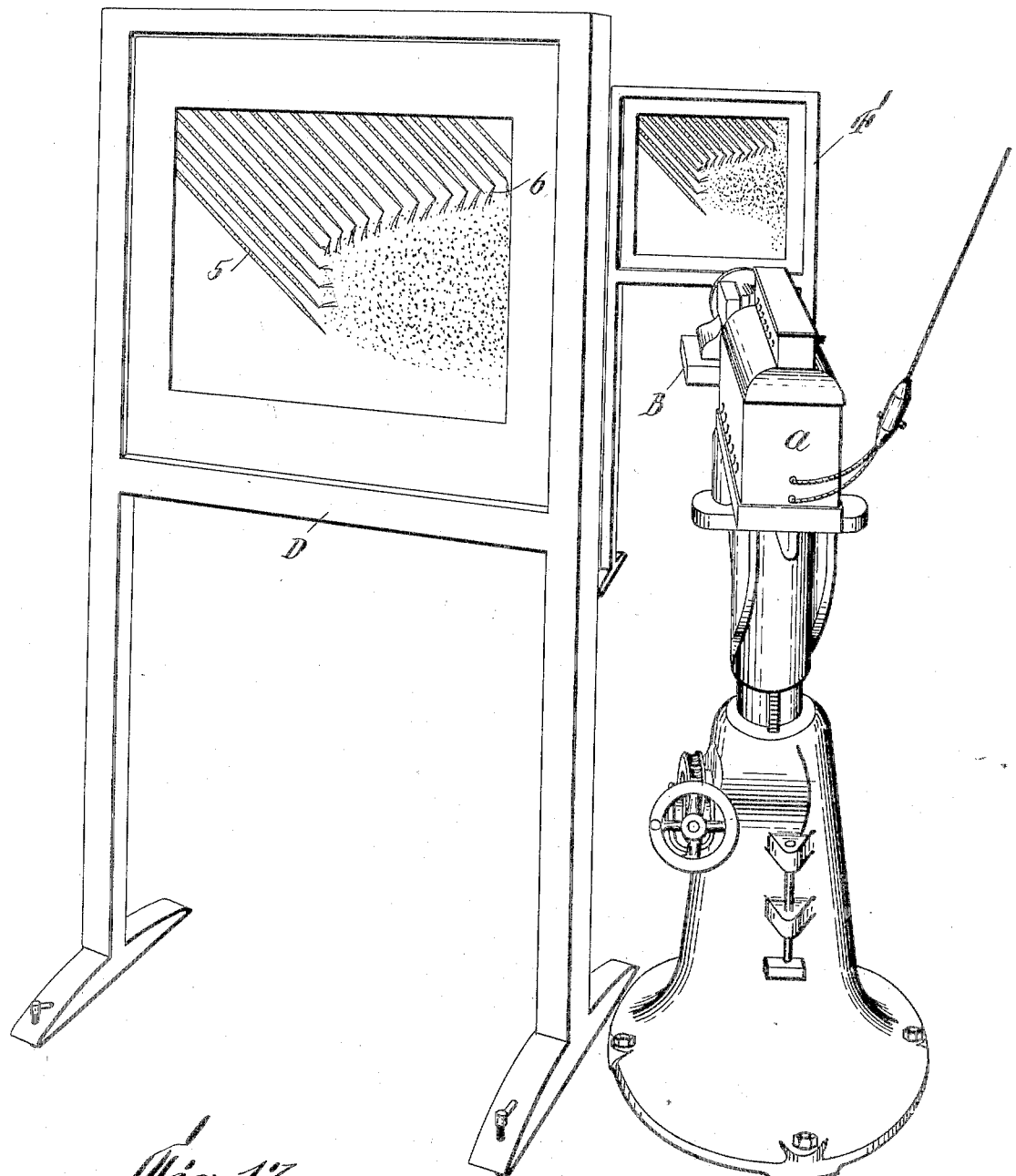

Patented Oct. 22, 1929

1,732,730

UNITED STATES PATENT OFFICE

RUSSELL W. PORTER AND ROBERT O. BEARDSLEY, OF SPRINGFIELD, VERMONT, ASSIGNORS TO JONES & LAMSON MACHINE COMPANY, OF SPRINGFIELD, VERMONT, A CORPORATION OF VERMONT

METHOD AND APPARATUS FOR MEASURING AND COMPARING GEARS AND THE LIKE

Application filed May 3, 1923. Serial No. 636,311.

This invention relates to a method of and apparatus for measuring and comparing gears and other objects of which the contour in any plane may be readily determined. For example, in practice it is desirable to know the profile between the end faces of gear teeth since the profile may not be the same throughout the axial dimension of the teeth and the end faces are often chamfered or present rough and torn edges which do not represent the contour of the gear which is in active use. By the method herein described it is possible to measure, gage or test, the contour of a gear tooth in substantially any plane approximately parallel to and included within the planes of the end faces of the teeth.

By means of the present invention the contour at any plane desired may be accurately determined.

For a more complete understanding of this invention reference may be had to the accompanying drawings in which Figure 1 is a side elevation of the projector mechanism.

Figure 3 is a plan partly in section of a gear staging device.

Figure 4 is an elevation of the same.

Figure 5 is a diagrammatic plan of the entire apparatus.

Figure 6 is a detail showing the portion of the gear in the field of the projected light beam.

Figures 7 and 8 are views of portions of the projected image.

Figure 13 is a perspective showing the entire apparatus.

Figures 1, 2:
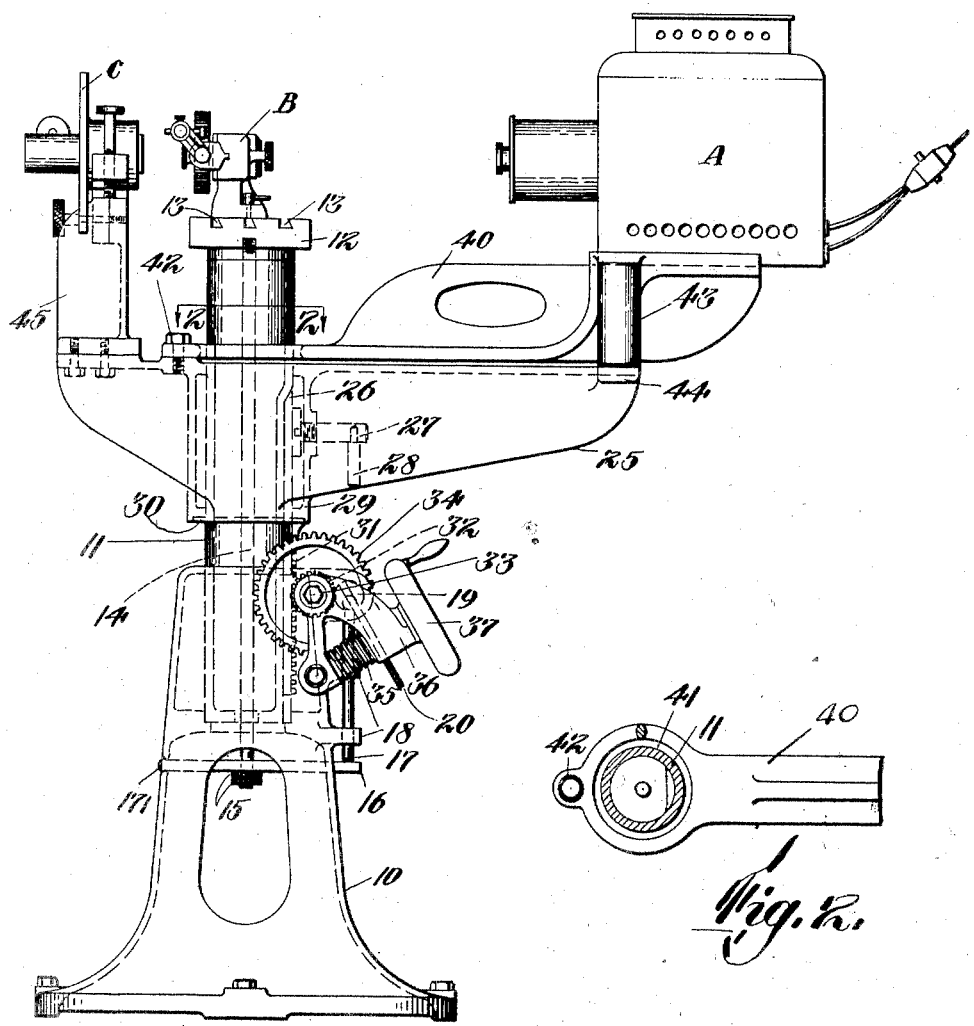
Figure 2 is a detail section on line 2—2 of Figure 1.

In carrying out the method of this invention a beam of light is projected across the edge of the gear, or other object the contour of which is to be determined, through a lens, which is positioned so that its focal plane coincides with the desired plane of the object the contour of which is to be measured, the image being thrown upon a screen considerably magnified so that the contour may be studied. It has been found that if a lens or microscope through which the image is projected is so designed as to have a "thin" focal plane, that is, is so designed that a slight movement out of the exact focal plane in either direction causes a pronounced blur in the image, and if a finder be moved in the focal plane of the lens toward the object, then as the finder approaches the object, an image or reflection of the finder in the surface is produced which is projected in sharp focus, together with the image of the finder itself. If the finder be brought into contact with the surface, the images of both the finder itself and its reflection in the object surface meet, this meeting point being indicated distinctly on the projection screen. Should the finder be separated a short distance from the object, the edge contour of the object in the desired plane is, naturally, midway between the projected images of the finder and its reflection in the surface, though the contour of the surface itself is not then indicated by any distinct outline on the screen. While if the surface of the object is ground, lapped or otherwise polished, the reflection of the finder therein is quite pronounced, it has been found in practice that the use of the process is not confined to highly polished surfaces as even roughly cut hardened gears with the black of the surface on them show some reflection under the glare of a beam of light such as produced by an electric arc, which is sufficient for testing purposes.

Figures 6, 7, and 8 of the drawings show one manner in which the projected image of the finder and its reflection in the surface of the object may be made use of. In Figure 6 at 1 is shown a portion of a gear tooth, a beam of light, the outline of which is indicated by the circle 2 being projected thereagainst. 3 indicates a series of needles having sharp points 4 (constituting the finder) which may be brought toward or into contact with the tooth surface in the focal plane of the lens or microscope through which the images are to be projected,—which plane also coincides with the plane in which it is desired to measure the contour of the gear tooth.

In Figures 8 and 13 are shown the appearances on the screen of the images of some of the finder elements and their reflections in the surface of the gear tooth, the images of the needles of the finder being indicated at 5 and the reflections at 6. When the finder contacts with the surface of the tooth, these images contact as shown in Figure 7. By drawing on the screen a line connecting these junction points between the projected images a faithful outline of the object in the plane desired is produced. It is not, however, necessary that the finder actually contacts the surface since in the position shown in Figure 8 if the finder is spaced from the tooth surface, it is possible to draw a line midway between the images of the finder needles and their reflections which is found will exactly coincide with the line formed when the finders actually contact the surface and which will indicate the contour of the tooth provided the surface to be tested is generated by a straight line.

In Figure 5 is indicated diagrammatically an apparatus by which this method may be carried out, while Figure 13 shows the same in perspective. If the surface is not generated by a straight line the reflection is distorted more or less, and actual contact between the images is necessary to accurately determine the surface contour. If the source of light were just a point it would be necessary that the surface of the object to be tested should be at a slight angle to the ray of light, but since in ordinary practice the source of light emits a bundle of rays, it is not essential that the surface of the object be thus angularly arranged. And of course the surface must be of sufficient breadth transversely of the plane containing the contour line to be examined, to reflect the image of the finder, so that the image of the reflection as well as that of the finder may be projected on the screen.

Referring to these figures a projector lamp housing is indicated at A. At B is indicated a device for staging the gear or other object to be measured and also for holding the finder. At C is indicated the microscope or lens in the focal plane of which the finder and the desired plane in the object are positioned. In order that the operator may be able to manipulate the finder or the object as desired and yet be able to closely observe the images on the screen, the screen, which is preferably of translucent material such as ground glass, may be placed at D at one side of the projecting mechanism, the position of the operator being indicated in Figure 5 at E.

In order to cause the image to be projected on the screen in this position, a mirror is indicated at F to receive the image projected through the lens and reflect back against one face of the screen, the images being observable by the operator on the opposite side. The mirror should be silvered on its forward face in order that the images may be reflected as completely as possible without causing a double image to be reflected as would be the case if the reflecting surface were on the rear side of a glass since images would be reflected from both the forward and rear faces of the glass.

Figure 9:
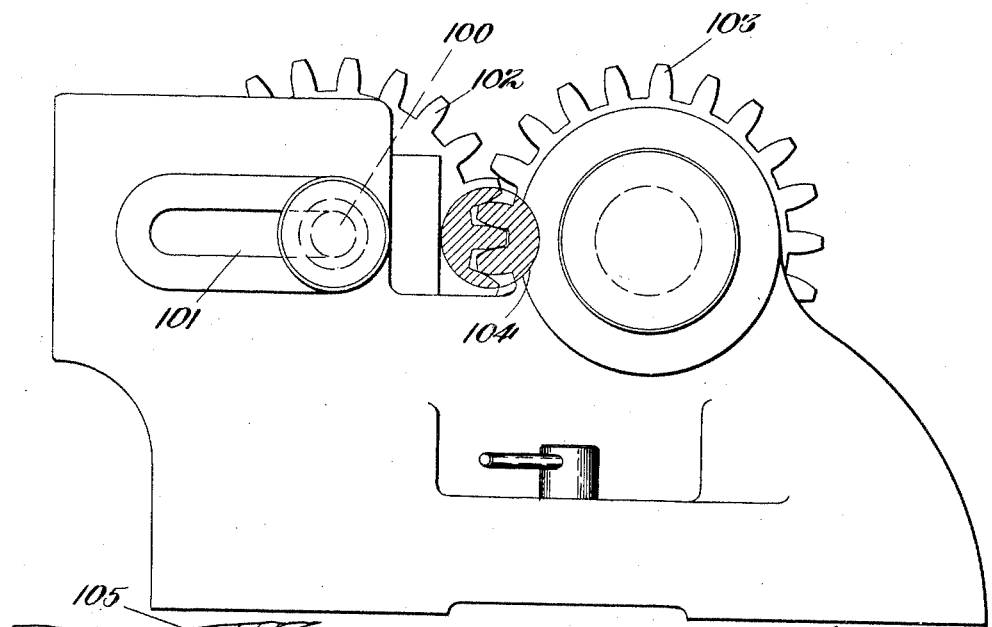
Figure 9 is a plan of a different form of staging device.
Figure 10:
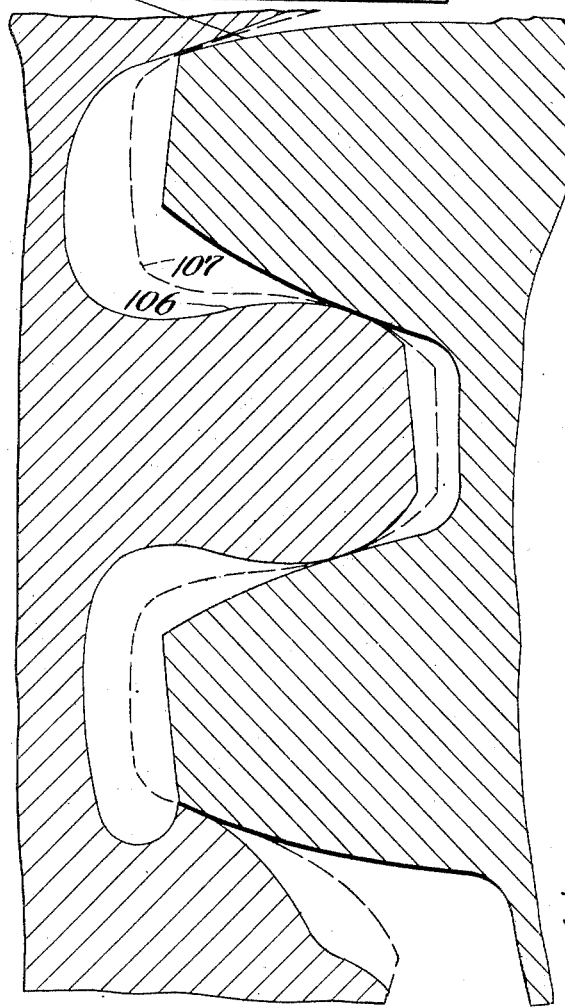
Figure 10 is a fragmentary view of the image projected with the device of Figure 9.

Details of the projector mechanism are shown in Figures 1 and 2 while an object staging device particularly adapted for gears has been shown in Figures 3, 4, and 9. Referring to Figures 1 and 2, 10 indicates a machine base having upstanding thereon a cylindrical column 11 which carries rotatably on its upper end a table 12 having its upper face formed with grooves 13 thereacross to which may be fixed the staging device B. In order that this table may be fixed in any desired position of rotative adjustment to properly present the surface of the object to be tested to the lens it has fixed thereto a rod 14 which extends axially of the column and has threaded on its lower end a pair of knurled check nuts 15 forming an abutment. Engaging on the upper face of the top check nut is the intermediate portion of the lever 16 fulcrumed at 171 to the base 10. The opposite end of this lever has engaging thereon the lower end of a push rod 17 slidably mounted in lugs 18 projecting from the base 10. Engaging the upper end of this push rod 17 is a cam member 19 having an operating handle or lever 20 fixed thereto. By manipulation of this handle the cam 19 may be caused to press the rod 17 firmly against the abutment of lever 16 causing the rod 14 to be pressed downwardly to hold the table 12 firmly in position. By movement of the lever 20 in the opposite direction the cam 19 may be retracted from the push rod 17, thus relieving the tension on the rod 14 and permitting the table 12 to be turned. Slidably and rotatably mounted on the column 11 is a platform member 25. This member carries a curved member 25 engaging the peripheral face of the shoe 26 engaging the peripheral face of the column and which may be tightened thereagainst by means of a clamping screw 27 having an actuating handle 28, the tightening of this shoe against the column acting to prevent rotation of the platform 25 relative to the column. The column passes through a sleeve portion 29 of the member 25, this sleeve portion serving to house the shoe 26; and the lower face of this sleeve is provided with an annular recess 30 within which extends the upper end of a rack bar 31 slidable in a vertical guideway in the column. The member 25 rests by its weight on the rack bar and by manipulation of the rack bar the height of the platform relative to the column may be adjusted. For this purpose a pinion 32 fixed to a shaft 33 journaled in the base 10 engages the teeth of the rack bar 31 and the shaft 33 has a worm wheel 34 with which engages a worm 35 supported in a bracket 36. This worm 35 is formed on or secured to a shaft which carries at its outer end an actuating hand wheel 37. The platform 25 is adapted to support the projecting lantern and the microscope or lens through which the images are to be projected. In order to support the lantern with capability of a slight amount of angular adjustment, an arm 40 has been provided which, as shown more clearly in Figure 2, has an aperture 41 therethrough near one end of somewhat greater diameter than the column and through which the column passes. The adjacent end of the arm is pivoted to the upper face of the platform by means of a pivot bolt 42. The opposite end of this arm has fixed thereto the projector A which is preferably provided with a light source of considerable power and concentrated in a small area such as may be provided by an electric arc. The arm 40 as shown is provided with a depending supporting flange 43 which is adapted to ride on a trackway 44 of a platform 25. By tightening the pivot bolt 42 the arm may be fixed against swinging movement,—the limits of which are defined by the engagement of the column with opposite sides of the opening 41. On the opposite side of the column 11 the platform 25 has a bracket 45 extending upwardly therefrom which supports the microscope or lens member C. While this member is preferably formed as a microscope for the purposes of this application it will be referred to as a lens, since it is only essential that the optical effect of the lens be employed, the particular type of lens most suitable for the purpose being used, and the lens being so related to the projector as to receive the beam of light therefrom after passing across the edge of the object to be tested which is positioned in the focal plane of the lens.

The staging device for the object, which is here represented as a gear, is shown more particularly in Figures 3 and 4, and comprises a standard 50 which is adapted to slidably engage the grooves 13 of the table 12 and be fixed in position thereon by means of a clamp 51. This standard 50 has a bearing 52 which as shown has a bushing 53 therein through which a mandrel 54 may be passed, this mandrel or object holder being constructed to receive the gear thereon. In order to support the gear with capability of rotation, if desired, the mandrel is provided with an annular flange 55 which may be seated against one face of the bearing 52 and on its opposite face it may have a plurality of projecting bosses 56, three being shown, against which one end face of the gear may engage to provide a three point support for the gear. The mandrel may also have a pair of angularly spaced bosses 57 projecting from its cylindrical periphery, and a plunger 58 spring pressed outwardly in angular relation to the bosses, the bosses and plunger being adapted to be within the bore of the gear and to engage its inner wall so as to support the gear in proper axial position. The gear may be held in position on the mandrel by means of a thumb nut 60 threaded on the end of the mandrel and engaging a member 61 having a plurality of outwardly extending spring fingers 62 positioned to engage on the opposite face of the gear from the bosses 56. By this means the gear is held with capability of rotation under a frictional resistance which may be varied by varying the tightness of the thumb nut 60 and with its edge face in which the contour line to be examined lies exposed to the beam of light.

Figure 11:
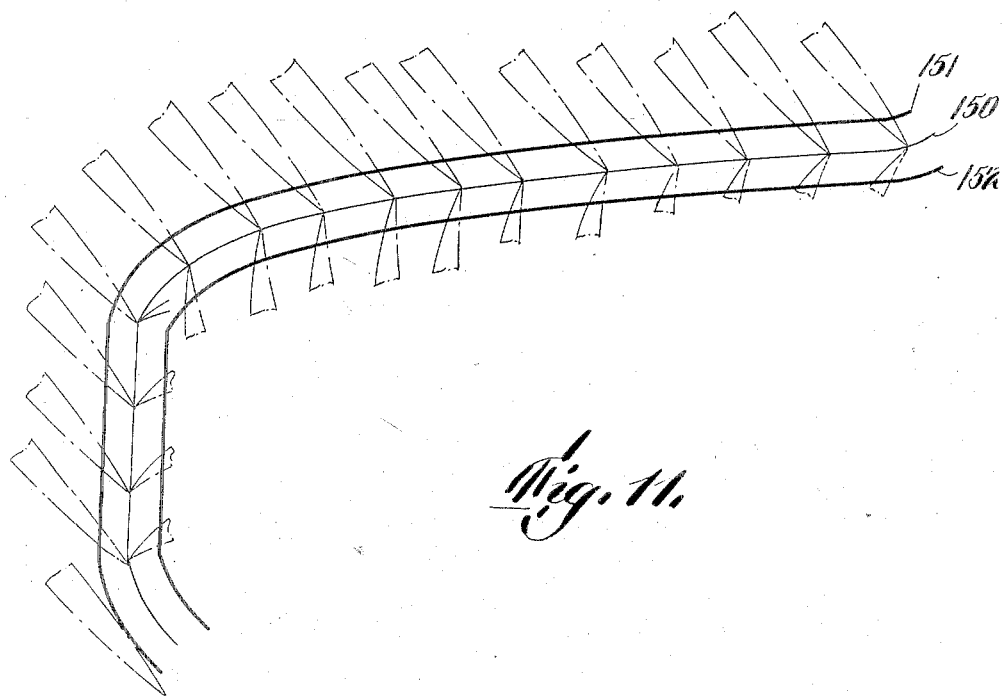
Figure 11 shows the manner of marking tolerance limits on the chart by the use of a standard gear.
Figure 12:
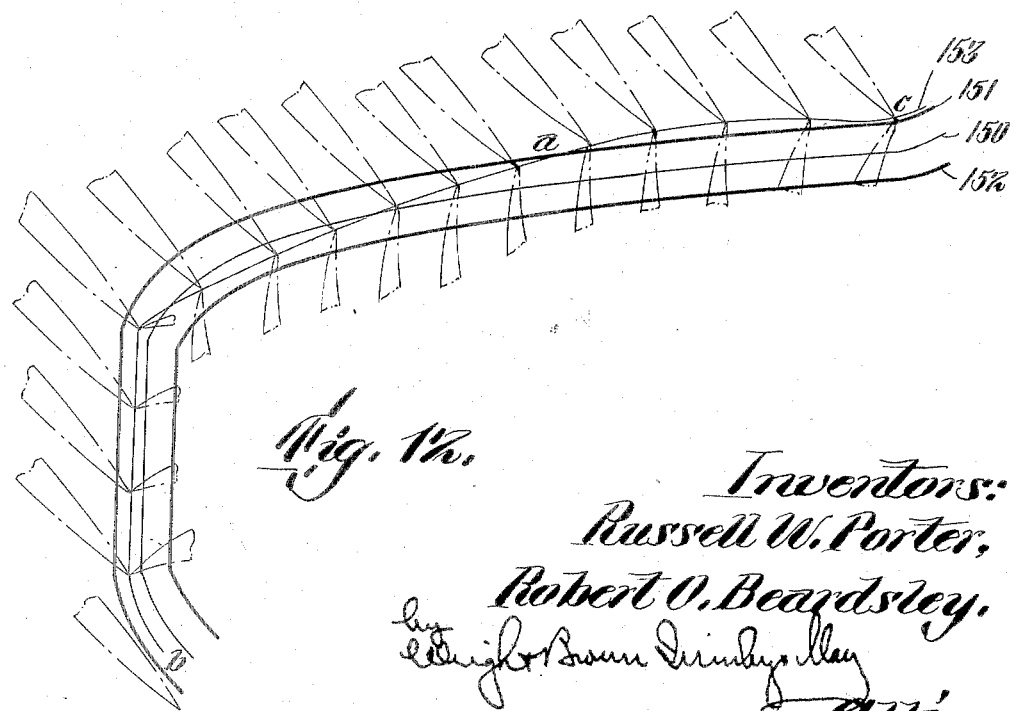
Figure 12 illustrates the comparison with said limits of a gear to be tested.

The gear may be held in any desired rotational position by an indexing device, this device as shown comprising a plunger 65 having a conical end 66 engaging between adjacent teeth of the gear. This plunger is preferably mounted so as to be retractible at will in order to permit the gear to be rotated by hand to bring successive teeth into the field of the projected light beam. For this purpose it is shown as extending through a sleeve 70 which is fixed in position as by means of a set screw 72 within a boss 71 extending from the standard 50. A spring 73 surrounds a reduced portion of the plunger and reacts between its head 74 and a plug 75 threaded in the rear end of the sleeve. Outwardly of the plug this plunger has an actuating head 76 terminating in a knurled flange 760 by which it may be grasped. Also carried by the staging device B is the finder mechanism. This may be supported in any suitable way, but as shown is carried by the plunger to be retracted therewith. For this purpose the portion 76 of the plunger has engaging thereon a collar 80 which may be split, if desired, and clamped on the portion 76 by means of a screw (not show), this collar 80 being formed at the end of an arm 81 having a perforated boss 82 at its opposite end through which passes a supporting rod 83. The rod 83 has a shoulder 83' thereon and the boss 82 is clamped between this shoulder and a knurled nut 84 threaded on the adjacent end of the rod. The opposite end of this rod has projecting therethrough at right angles a rod 85 which is axially adjustable therein and may be fixed in position by means of a thumb screw 86. One end of this rod 85 has a channel shaped supporting member 88 through the flanges 89 of which is passed a shaft 90 having a knurled head 91 by which it may be turned. Intermediate the flanges 89 the shaft 90 carries a sleeve 92 of friction material such as rubber, forming a yielding roller, which engages the outer faces of a series of rod or needle members 93 positioned between the sleeve 92 and the bottom of the channel 88 in a single plane between the flanges 89. By turning the shaft 90 the roller 92 engaging these needles, slides them in axial directions within the channel. By this means the points of the needles may be projected against the object to be measured each needle as it contacts with the object being stopped thereby without interfering with the continued motion of the remaining needles which have not yet contacted with the object. By this means all the points may be moved into contact with the object, or, as herein shown, with the face of the gear tooth which it is desired to test. The series of needles are adjusted to move in the plane of the gear in which it is desired to make the test and by adjustment of the staging device and the lens this plane is adjusted to coincide with the focal plane of the lens. The beam of light is then projected past the edge of the tooth covering substantially the field shown by the circle 2 in Figure 8 and the shaft 90 is then turned so as to bring the needles toward contact with the object. As the operator brings these needles into position he is enabled to watch their images and the images of their reflections in the surface as projected against the screen D and, as above described, he may be able to trace with exactness on the screen the contour of the object in the desired plane as shown by the dash line on Figure 7. By retracting the plunger and the finders therewith, the gear may be then rotated to a succeeding tooth whose contour may be compared with that already drawn. Likewise it is possible to compare the tooth outlines with standard diagrams which may be drawn on the screen though in this case it is important that the parts be adjusted so that the image of the tooth will correspond in size to that of the standard image. Likewise the finder may be positioned by contacting with a standard gear, and the correctness or lack of correctness of another gear determined by noting the contact or lack thereof of the images of the various needle points and their reflections on the screen. Comparison with a standard gear is illustrated in Figures 11 and 12. In Figure 11 the line 150 represents the contour on the screen defined by the images of the finder and its reflection in the surface of a standard gear. 151 and 152 represent limits of tolerance drawn on the screen on either side of the contour line 150 and causing the screen to become a tolerance chart. If now a gear to be tested is substituted in place of the standard gear and in the same position and the finder brought into cooperative relation therewith, the contour of this gear is thus superposed on the standard tolerance diagram formed by the lines 151 and 152 as shown at 153 in Figure 12. It will be noted that between the points a and b in the illustrative embodiment, the line 153 lies between the tolerance limit lines 151 and 152, while between the points a and c it lies outside of these limits. In case the outline of the tooth to be tested lies entirely within the tolerance limits the gear may be accepted as sufficiently close to the standard gear, but should any portion lie outside of these limits, the gear is not sufficiently close to pass inspection. With this manner of determining the tolerance limits, it will be noted that there is no difficulty in projecting the images for the gear to be tested at the same scale as the diagram on the chart. This is therefore more practical than to attempt to draw theoretically perfect charts on which the images are projected for purpose of comparison. This method also takes care of any optical distortions caused by the lens which might cause the image projected from a theoretically perfect gear to vary somewhat from the theoretically perfect gear outline on the chart. Any such optical distortion is therefore taken care of automatically by constructing the diagram directly from a standard gear through the same optical system as is used for the gear to be tested, since any optical errors are the same in both cases and thus neutralizing each other.

If it is desired the end 66 of the plunger may be made slightly eccentric to the main portion thereof by which means a delicate indexing motion of the gear may be produced by rotation of the plunger, this being a test in addition to that produced by the finders and which ordinarily will not be used at the same time.

Another way in which the test can be effected is by substituting for the series of needle points a thin templet. In this case the templet may be mounted so as to mesh with the gear, as shown in Figures 9 and 10, it being carried by a shaft 100 adjustable in a slot 101 in the staging device, the templet being indicated at 102 and the gear to be tested at 103. The field of the light beam projected against the gear and templet is then indicated by the shaded circle 104 and the projected image is shown in Figure 10. In this case the edge of the templet is sharply projected as at 105 and an image is shown at 106 of its reflection in the tooth surface of the gear. The tooth face itself will not be shown on the screen but only the reflection of the templet in the tooth face, the actual contour of the tooth face being half way between the images of the templet and of its reflection as along the dash line 107. By rotating the gears and templet while so held the accuracy with which the templet and gear mate may be readily determined by noting the approach and recession of the images of the templet and its reflection in the tooth surface.

While the method and apparatus have herein been described as particularly applicable for testing or measuring gears, yet of course no limitation to such use is intended, since it is apparent that the apparatus and the method may be employed for testing or measuring many other objects.

Having thus described certain embodiments of this invention it should be evident that many changes and modifications might be made therein without departing from its spirit or scope as defined by the appended claims.

We claim:

1. The method of determining the contour of an object having a surface, in a given plane intersecting said surface, which comprises placing said object so that said plane coincides with the focal plane of a lens, projecting a beam of light past said object substantially perpendicular to said plane through said lens and against a screen, bringing a finder toward said object in said plane whereby the image of the finder is reflected in said surface, and noting where the projected image of said finder meets the projected images of the reflection thereof in said surface as said finder contacts said object.

2. The method of determining the contour of an object having a surface, in a given plane intersecting said surface, which comprises positioning said object so that the said plane coincides with the focal plane of a lens, projecting a beam of light past said object through said lens and against a screen, bringing an edge closely adjacent to said object at various points in said plane whereby an image of the edge is reflected in said surface, and noting where the projected image of said edge and the projected image of the reflection of said edge in said object meet when the edge contacts the object.

3. The method of determining the contour of an object having a surface, in a given plane intersecting said surface, which comprises placing said object so that the said plane coincides with the focal plane of a lens, directing a beam of light substantially perpendicularly to said plane past the edge of said object through said lens and against a screen, bringing a finder close to the object in said plane whereby an image of the finder is reflected in said surface, and drawing on said screen a line bisecting the space between the image projected thereon from said finder and the projected reflection of said finder on the surface of the object.

4. The method of determining the contour of an object having a surface, in a given plane intersecting said surface, which comprises placing said object so that the said plane coincides with the focal plane of a lens, directing a beam of light substantially perpendicular to said plane past the edge of said object through said lens and against a screen, bringing a plurality of pointed finder elements in said plane closely adjacent said object whereby images of said elements are reflected in said surface, and noting the outline indicated midway between the projected images of said finder points and the projected images of the reflections of said points in the surface of said object.

5. A method of testing the contour of an object having a reflecting surface, which comprises bringing a finder toward said surface in the focal plane of a lens, projecting on a screen images of the finder and of the reflection of the finder in the said surface, and comparing such images.

6. A method of testing the contour of a surface of an object in a given plane intersecting said surface, which comprises bringing a finder towards said surface in said plane, projecting on a screen, by means of a lens whose focal plane is substantially coincident with the aforesaid plane, images of both the finder and its reflection in said surface, and comparing such images.

7. A method of testing an object having a surface, which comprises arranging said object so that the focal plane of a lens intersects said surface, bringing a finder toward said object in said plane, projecting from a source of light by means of said lens images of the finder and of its reflection in the surface of said object on a screen having indicated thereon the boundaries of tolerance of such object, and comparing such images with such tolerance boundaries.

8. The method of inspecting and gaging surfaces which consists in reflecting the image of a finder in said surfaces, magnifying the direct and reflected images, and examining the enlarged images in connection with a chart having indicated thereon the boundaries of tolerance or permissible deviation from a standard surface.

9. The method of inspecting and gaging surfaces which consists in juxtaposing a finder and a standard surface, projecting on a screen the images of the finder and the reflection of said finder in said surface, marking on said screen boundaries of tolerance for the contour indicated by said images and then substituting for said standard surface a surface to be compared therewith and comparing with said tolerance boundaries the images of said finder and its reflection in the surface to be compared.

10. The method of inspecting and gaging surfaces which consists in reflecting a finder in a standard surface and projecting the direct and reflected images of the finder on a screen, replacing the standard surface by a surface to be gaged, reflecting said finder in said surface to be gaged and projecting the direct and reflected images of the finder on the screen, and comparing the last named projected images with the first named projected images.

11. The method of inspecting and gaging gears which comprises projecting a beam of light through a lens having its focal plane intersecting a reflecting tooth surface of a standard gear between its end faces and on to a screen, bringing a finder in said focal plane adjacent to said surface to cause the magnified images of the finder and its reflection in said surface to be projected on said screen to define a contour, marking on said screen tolerance limits for said contour, substituting for said standard a gear to be examined similarly positioned, bringing the finder adjacent to the surface of said substituted gear in the focal plane of said lens, and comparing the contour defined by the magnified images of the finder and its reflection in said substituted gear surface with said tolerance limits.

12. The method of inspecting and gaging gears which comprises marking tolerance limits of a gear outline on a chart, reflecting a finder in a surface of a gear to be gaged and projecting the direct and reflected images of the finder onto the chart to define an outline of the gear to be gaged, and comparing the outline thus defined with the tolerance marks on said chart.

13. Steps in the method of inspecting and gaging gears, which comprise reflecting a finder in a surface of a gear to be gaged and projecting the direct and reflected images of the finder onto a chart having tolerance limits marked thereon to define an outline of the gear to be gaged, and comparing the outline thus defined with the tolerance marks on the chart.

14. An apparatus of the class described comprising a projector, a lens for receiving a beam of light from said projector, means for supporting an object to be tested in the focal plane of said lens, a finder in the focal plane of said lens, and a screen to receive the images of the finder and its reflection in the object.

15. An apparatus of the class described comprising a projector, a lens for receiving a beam of light from said projector, means for supporting an object to be tested in the focal plane of said lens between said lens and projector, a finder also in said focal plane, a screen positioned at one side of said projector, and a mirror for receiving the image projected through said lens and reflect it on to said screen.

16. An apparatus of the class described comprising a projector, a lens for receiving a beam of light from said projector, means for staging an object in the focal plane of said lens, a finder having an edge in the focal plane of said lens and movable toward and from said object, and a screen for receiving the projected images of said finder and its reflection in the object.

17. An apparatus of the class described comprising a projector, a lens for receiving a beam of light from said projector, means for staging an object in the focal plane of said lens, a finder having an edge in the focal plane of said lens and movable toward and from said object, and a screen for receiving the projected images of said finder and its reflection in the object, said lens having a thin focal plane whereby only an outline in the focal plane may be sharply projected.

18. An apparatus of the class described comprising a projector, a lens for receiving a beam of light from said projector, means for staging an object so that an outline to be tested is in the focal plane of said lens, an edge finder adjustable toward and from said object in said focal plane, and a screen for receiving the image projected from said lens.

19. An apparatus of the class described comprising a projector, a lens for receiving a beam of light from said projector, means for staging an object so that an outline to be tested is in the focal plane of said lens, a series of pointed finder elements movable in said focal plane toward and from the object and a screen for receiving the image projected from said lens.

20. An apparatus of the class described comprising a projector, a lens for receiving a beam of light from said projector, means for staging an object so that an outline to be tested is in the focal plane of said lens, a series of pointed finder elements movable in said focal plane toward and from the object, their points being adapted to conform in series to said outline, and a screen receiving the image projected from said lens.

21. In an apparatus of the class described, a projector, a lens for receiving a beam of light from said projector, a screen for receiving an image from said lens, a support, means carried by said support for rotatably holding a gear in the focal plane of said lens, and means also carried by said support for supporting a gear templet in the focal plane of said lens and meshing with said gear.

22. In an apparatus of the class described, an upright column, a supporting table vertically adjustable relative to said column, an arm having an opening therethrough larger than said column pivoted to said table, said column passing through said opening, a projector carried by said arm, said arm and projector being relatively adjustable about the pivot of said arm to the extent permitted by engagement of said column with the sides of said opening, and a lens carried by said table on the opposite side of said column to receive a beam of light from said projector.

23. In an apparatus of the class described, a column, a platform vertically adjustable relative to said column, a table at the top of said column axially adjustable relative thereto, a projector carried by said platform at one side of said column, a lens carried by said platform at the opposite side of said column, and means attachable to said table for supporting an object in the focal plane of said lens and in the path of a light beam from said projector.

24. In an apparatus of the class described, an upright column, a platform rotatably mounted on said column, means to clamp said platform to said column, a rack bar slidable axially of said column and supporting said platform, means to actuate said rack bar to raise and lower said platform, a projector on said platform at one side of said column, a lens on said platform at the opposite side of said column, and means for supporting an object at the top of said column between said projector and lens.

25. The method of determining the contour of an object in a given plane intersecting the object, which comprises juxtaposing a finder in said plane and the object and observing said finder and its reflected image in the surface of the object.

26. The method of determining the contour of an object in a given plane intersecting the object, which comprises juxtaposing the surface of said object and several points of a finder in said plane, and noting the points midway between each said finder points and their respective reflected images in the surface of the object.

In testimony whereof we have affixed our signatures.

RUSSELL W. PORTER.
ROBERT O. BEARDSLEY.